US006742265B2

(12) United States Patent
Radel et al.

(10) Patent No.: US 6,742,265 B2
(45) Date of Patent: Jun. 1, 2004

(54) HAND GUARD BLOCK

(75) Inventors: Harry Radel, Geesthacht (DE); Dieter Sellmann, Hamburg (DE)

(73) Assignee: Dolmor GmbH, Hamburg (DE)

(*) Notice: Subject to any disclaimer, the term of this patent is extended or adjusted under 35 U.S.C. 154(b) by 76 days.

(21) Appl. No.: 10/105,011

(22) Filed: Mar. 22, 2002

(65) Prior Publication Data

US 2003/0057036 A1 Mar. 27, 2003

(30) Foreign Application Priority Data

Mar. 23, 2001 (DE) ..................................... 201 05 431 U

(51) Int. Cl.[7] .......................... B27B 17/00; F16D 51/00

(52) U.S. Cl. .......................... 30/382; 30/381; 188/77 R; 188/77 W

(58) Field of Search .......................... 30/381, 382, 383; 188/77 W, 77 R

(56) References Cited

U.S. PATENT DOCUMENTS 4,091,896 A * 5/1978 Wieland et al. ........... 188/77 R
4,324,045 A * 4/1982 Hoppner et al. .............. 30/381
4,370,810 A * 2/1983 Schurr et al. ................. 30/382
4,474,269 A * 10/1984 Kloberg et al. ............... 30/381
4,662,072 A * 5/1987 Wieland et al. ............... 30/382
4,721,193 A * 1/1988 Nagashima .................. 30/381
4,793,064 A * 12/1988 Nagashima .................. 30/382
5,480,009 A * 1/1996 Wieland et al. .......... 188/77 W

* cited by examiner

*Primary Examiner*—Hwei-Siu Payer
(74) *Attorney, Agent, or Firm*—Nash and Titus, LLC

(57) ABSTRACT

The invention entails a motor saw which includes a brake system for braking the motor, and which further includes a brake-system actuation arrangement comprising a lever and a positioning element which lever is held by the positioning element in a defined position and can be deflected in order to actuate the brake system. The positioning element of the actuating system engages with parts of the brake system, the positioning element limits the movement of the lever in a non-actuated brake system with a first force and the positioning element limits the movement of the lever with a second force in an actuated brake system by engaging with the brake system.

19 Claims, 6 Drawing Sheets

HAND GUARD BLOCK

FIELD OF THE INVENTION

The application claims priority from German application FRG 201 05 431.0, filed Mar. 23, 2001, and the entire contents of that application are incorporated herein by reference.

The invention entails a motor saw having a brake system for braking the motor and further including a brake-system actuation arrangement. The brake-system actuation arrangement comprises a lever and a positioning element, wherein the lever is held by the positioning element in a defined position and can be deflected in order to actuate the brake system.

BACKGROUND OF THE INVENTION

Known motor saws comprise a hand guard held in a preferred start position by positioning means. When the hand guard is deflected it can come in contact with parts of a brake system in order to release the brake.

However, such motor saws have the problem that the hand guard can be pressed in the direction of a handle grip (or hand bracket) of the motor saw and be pressed thereby against the hand of the user of the motor saw. This occurs in particular in certain cutting techniques such as cross-cutting, since the trunk (or stem) makes contact with the hand guard thereby.

SUMMARY OF THE INVENTION

The invention therefore addressed the problem of providing a motor saw that avoids the above-cited disadvantages of traditional motor saws, and in particular of providing a hand guard block (or stop) that has an elevated backward (blocking) resistance for a movement in the direction of the handle grip and at the same time assures a safe and reliable release as well as a tensioning of a brake system of the motor saw.

The problem posed is solved by a motor saw in accordance with the invention in that the positioning element of the actuating system engages with parts of the brake system, the positioning element limits the movement of the lever in a non-actuated brake system with a first force and the positioning element limits the movement of the lever with a second force in an actuated brake system by engaging with the brake system.

DETAILED DESCRIPTION OF THE PREFERRED EMBODIMENTS

According to an advantageous embodiment of the present invention the blocking catch (or pawl) has a notch with a first flank and a second flank. The lever has a stop pin that rests in the notch when the brake system is not actuated and that makes contact with one of the flanks upon a movement of the lever, depending on its direction of movement. Thus, given the appropriate design of the individual flanks, different amounts of return forces can be realized in different directions.

It is advantageous if the stop pin engages with the first flank when the lever moves in the direction of the handle grip and if the first flank is steeper than the second flank, as a result of which when the brake system is not actuated the return force against a movement of the lever in the direction of the handle grip is greater than in other directions.

The present invention has the further advantage that the first flank is arranged so that it lies vertically to the direction of movement of the stop pin, as a result of which a movement of the lever and therewith of the hand guard in the direction of the handle grip is blocked when the brake system is not actuated. In this total blockage the backward resistance is limited only by the strength (rigidity) of the participating structural components.

In an exemplary embodiment of the present invention the pressing through of the hand guard to the handle grip for tensioning the brake arrangement is made possible in an advantageous manner. This is made possible by linking the blocking catch with the braking mechanism. In particular, when the brake arrangement is actuated the blocking catch is withdrawn by a shift lever so that a tensioning by a storage spring is not hindered. The blocking catch is freed by the shift lever in sawing operation when the brake is tensioned, so that the hand guard is prevented from being pressed further to the handle grip.

It is advantageous that the backward resistance of the catch can be selected in accordance with the angular design of the catch flank. If the angle of friction (e.g., of resistance) is exceeded on the catch flank, a blocking force can be defined. If the angle of friction is dropped below, a total blockage occurs.

The invention and other embodiments and advantages are explained in the following with reference made to the figures.

Figure 1:
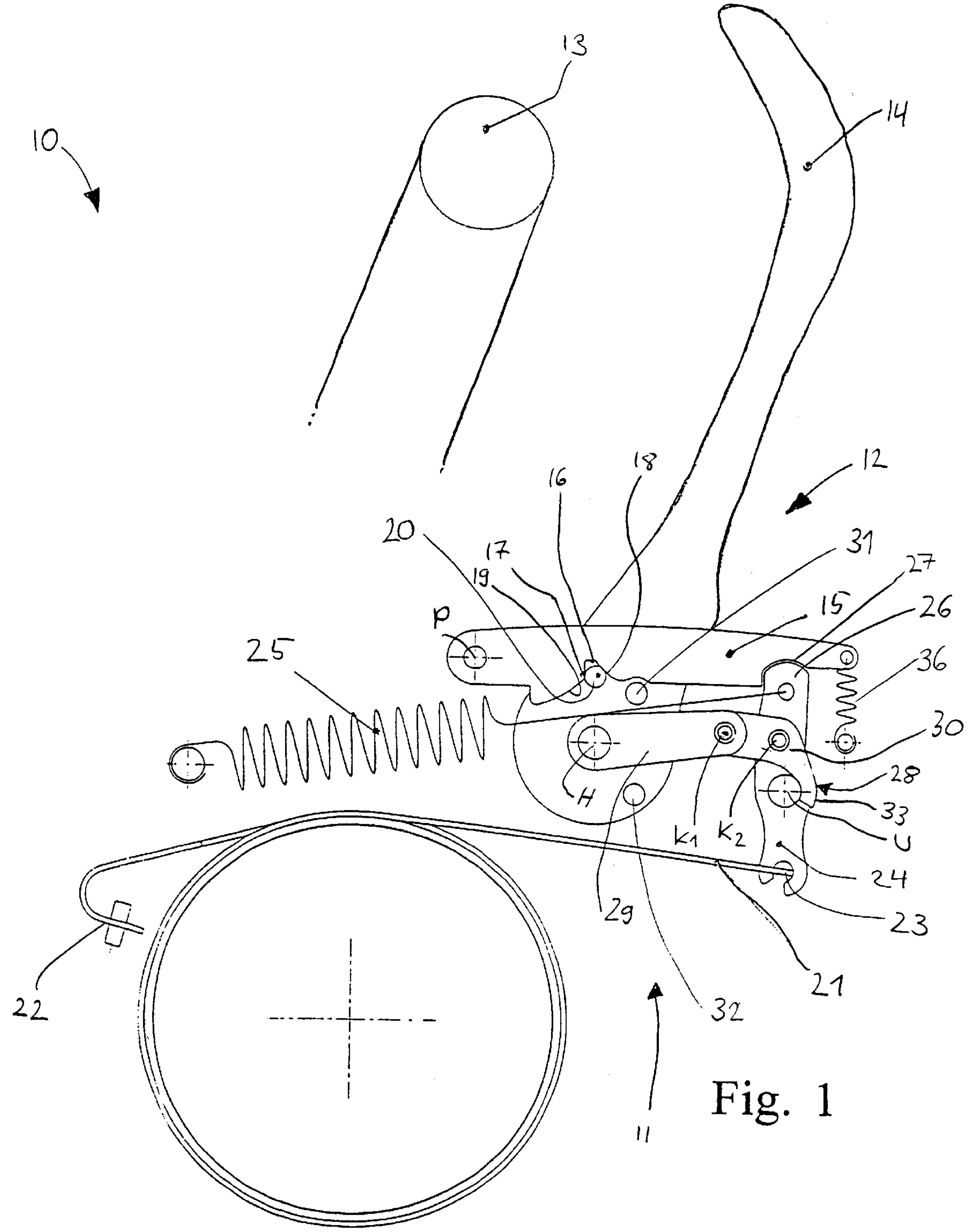
FIG. 1 is a schematic view of the motor saw in accordance with the invention during a sawing operation with blocked (or locked) hand guard.

FIG. 1 shows a motor saw 10 with brake system 11 and actuating arrangement 12. Motor saw 10 is held with one hand on handle grip 13 and with the other hand on a grip (not shown). Actuation system 12 comprises hand guard 14 located between handle grip 13 and the saw blade of motor saw 10 (not shown) on the right in FIG. 1. The hand guard serves, e.g., to make it possible to brake the chain of motor saw 10 if a hand should slip off from handle grip 13 in order that the hand can not get into the running chain saw. In the present instance hand guard is designed as lever 14 arranged so that it can rotate about axis (or shaft) H. The actuation arrangement also comprises positioning element 15 arranged so that it can rotate about axis (or shaft) P and is pre-tensioned by spring 36 for a clockwise rotation. The positioning element also comprises notch 16 that forms the first 17, second 18 and third 19 flanks on positioning element 15. Stop pin 20 is mounted in the lower area of lever 14 on this lever in such a manner that it is located in notch 16 when brake system 11 is not actuated and tensioned. Upon a movement of lever 14 in a non-actuated brake system, stop pin 20 contacts first flank 17 or second flank 18, depending on the direction of movement. Stop pin 20 forces positioning element 15 to rotate upward against the pre-tensioning of spring 36, as a result of which a return force is exerted on stop pin 20 and therewith on lever 14 which return force is a function of the angular design of the first and the second flanks 17, 18.

Brake system 11 of motor saw 10 comprises a brake band 21 that can be brought into engagement with a drum (not shown) upon an actuation of brake system 11 in order to brake the motor rotation. Brake band 21 is anchored on its one end 22 to the housing of the motor saw and fastened on its other end 23 to the lower end of shift lever 24 of brake system 11. Shift lever 24 is supported in such a manner that it can rotate about axis (or shaft) U and is pre-tensioned by a spring fastened on the upper end of shift lever 24 for a rotation about axis U. Upper end 26 of shift lever 24 rests in recess 27 of positioning element 15 when brake system 11 is tensioned and not actuated. On the one hand, the engagement of positioning element 15 with the upper end of shift lever 24 prevents the shift lever from rotating in the direction of its pre-tensioning when the brake system is not actuated, and on the other hand, as is described further below, positioning element 15 rests on upper end 26 of shift lever 24 when brake system 11 is actuated.

Finally, brake system 11 comprises two-membered knee lever 28 whose first member 29 is arranged so that it can rotate about axis H on one end and whose second member 30 is connected to shift lever 24 in such a manner that this member can rotate about axis K2. The two members 29, 30 of shift lever 24 are coupled in such a manner that they can rotate about axis K1. When brake system 11 is not actuated and pre-tensioned, knee lever 28, which is pressed through, prevents a rotation of shift lever 24 in the direction of its pre-tensioning.

The operating, release- and tensioning position of the parts of brake system 11 and of actuation arrangement 12 will now be described with reference made to FIGS. 2 to 6.

Figure 2:
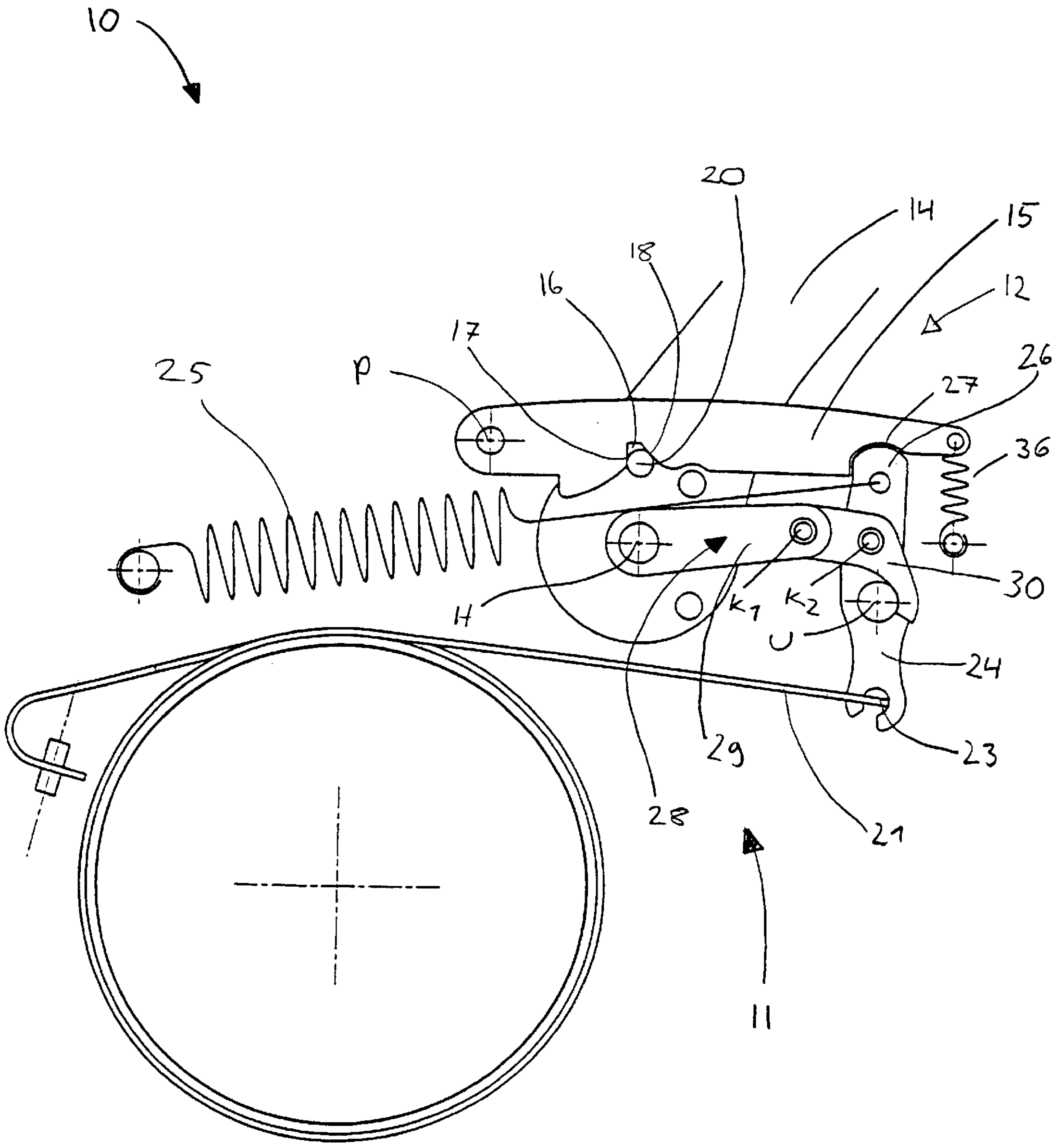
FIG. 2 is a detailed view of the lower part of FIG. 1.

FIG. 2 shows actuation arrangement 12 and brake system 11 during the sawing operation of motor saw 10. Lever 14 is located in its predefined initial position or in its blocked position and stop pin 20 rests in notch 16 of positioning element 15, which will be referred to in the following as blocking catch 15. Upon a movement of lever 14, contact pin 20 presses upon a movement in the direction of handle grip 13 on first flank 17 and upon a movement toward the front, that is, in the direction of the chain-saw blade (not shown) on flank 18 of notch 16. As already mentioned previously, the amount of the return force on lever 14 in the operating position of FIG. 2 is a function of the angular design of first and of second flank 17, 18. In a preferred exemplary embodiment of the present invention first flank 17 is designed to be vertical to the direction of movement of stop pin 20, as a result of which lever 14 is blocked against a movement in the direction of handle grip 13. In the operating position blocking catch 15 prevents the movement of shift lever 24 in the direction of the pre-tensioning given by spring 25 by the engagement in recess 27 with upper end 26 of shift lever 24 together with pressed-through knee lever 28.

Figure 3:
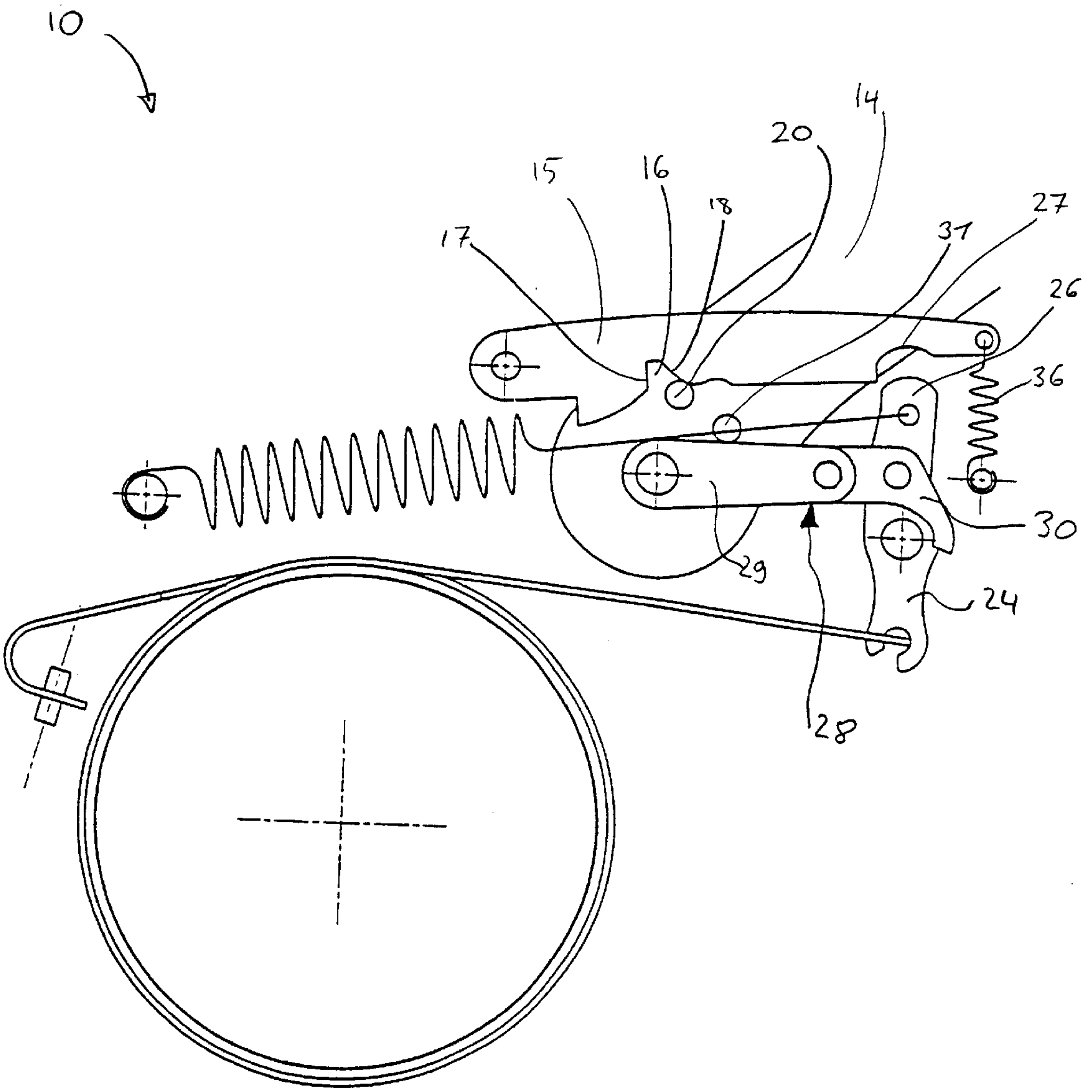
FIG. 3 is a schematic view of the motor saw of FIG. 1 in which the brake arrangement is released by a hand guard that is pressed forward.

In FIG. 3, lever 14 is moved forward, as a result of which stop pin 20 raises blocking catch 15 on account of the engagement with second flank 18 and frees upper end 26 of shift lever 24 when the deflection of lever 14 exceeds a certain degree. Stop pin 20 leaves notch 16 therewith. In addition, release pin 31 is mounted on lever 14 in the lower area of lever 14 which pin presses knee lever 28 in when the deflection of lever 14 to the front exceeds a certain threshold value. Connecting axis K1 of the two members 29, 30 of knee lever 28 moves downward as a consequence and frees shift lever 24 for a movement in the direction of the pre-tensioning of spring 25. A movement of shift lever 24 in the direction of the pre-tensioning results in a tractive force on end 23 of brake band 21, as a result of which brake band 21 engages with the brake drum (not shown) and brakes the motor.

Figure 4:
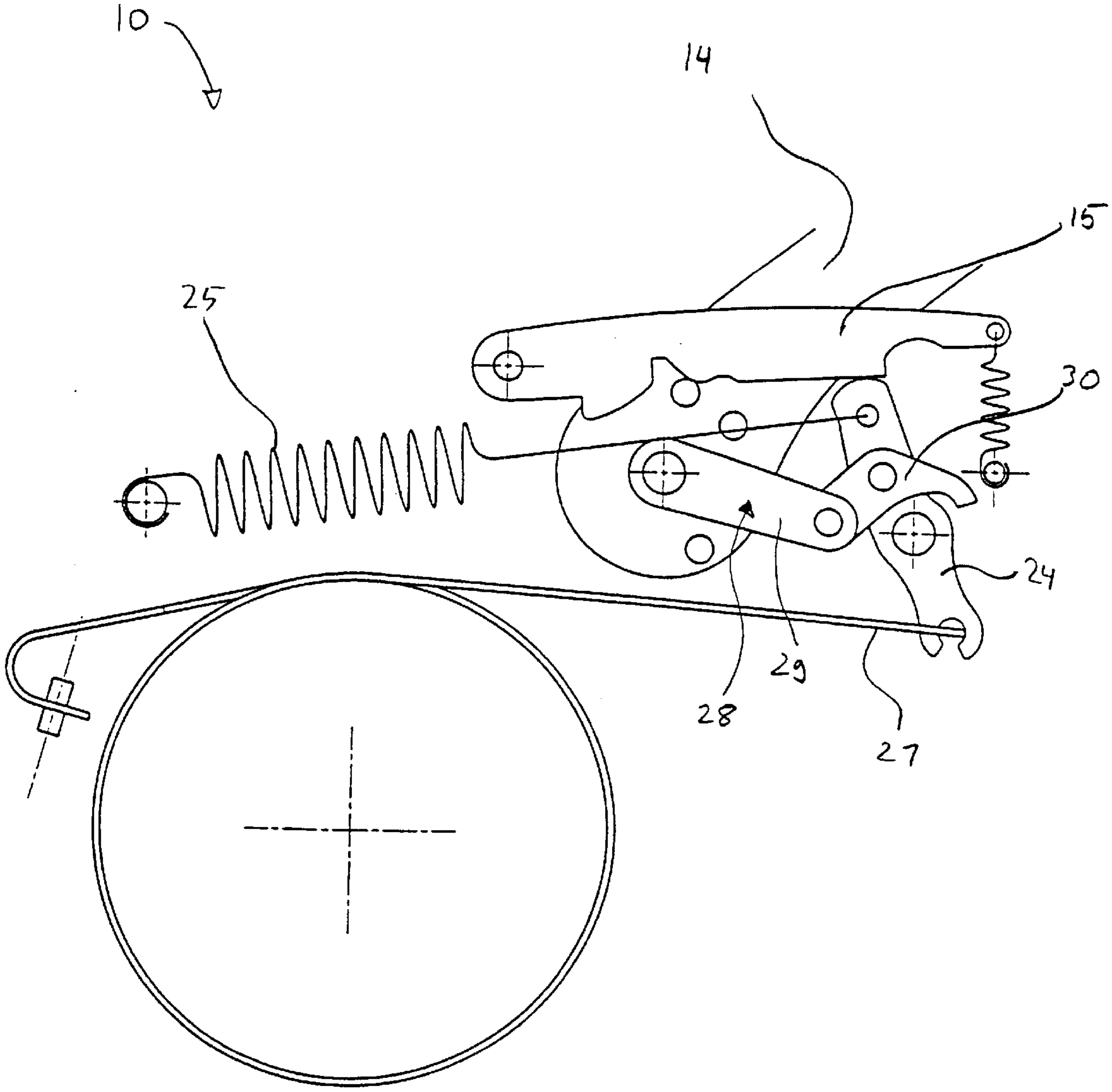
FIG. 4 is a schematic view of parts of FIG. 1 during the braking operation.

FIG. 4 shows the components of brake system 11 and of actuation arrangement 12 in the released state. Knee lever 28 is pressed in and upper end 26 of shift lever 24 has moved to the left, as a result of which blocking catch 15 rests on upper end 26 of shift lever 24. Lever 14 is free in this position for a tensioning movement that takes place by a movement of lever 14 in the direction of handle grip 13. This is made possible by the supporting of blocking catch 15 on upper end 26 of shift lever 24.

Figure 5:
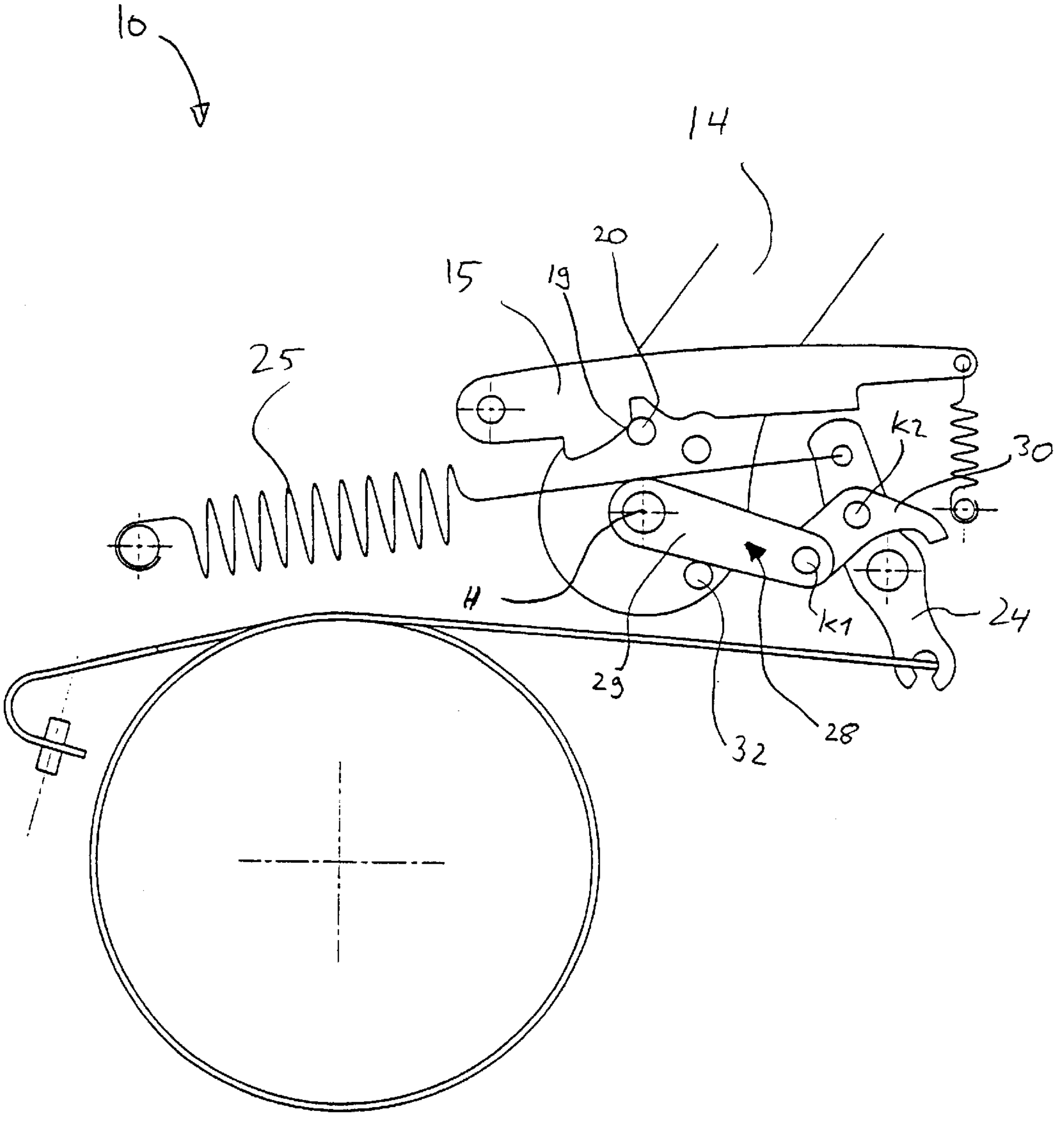
FIG. 5 is a schematic view of parts of FIG. 1 during the return of the brake.

FIG. 5 shows the tensioning of brake system 11. Stop pin 20 contacts third flank 19 of blocking catch 15 as a result of a movement of lever 14 in the direction of handle grip 13 and raises it in order to disengage the contact of blocking catch 15 with upper end 26 of shift lever 24 against the pre-tensioning of spring 36. Lever 14 comprises tensioning pin 32 underneath axis of rotation H of lever 14 which pin is mounted on lever 14. In the tensioning position tensioning pin 32 contacts the first member 29 of knee lever 28 and presses it upon a further movement of lever 14 in the direction of handle grip 13 back into the pressed-through position, as a result of which shift lever 24 moves back into its tensioned position and the engagement of brake band 21 with the brake drum (not shown) is disengaged. Attachment 33 of second member 30 prevents an overwinding (or overturning, with excessive rotation) of knee lever 28 during tensioning thereby by being supported on axis (or shaft) U.

Figure 6:
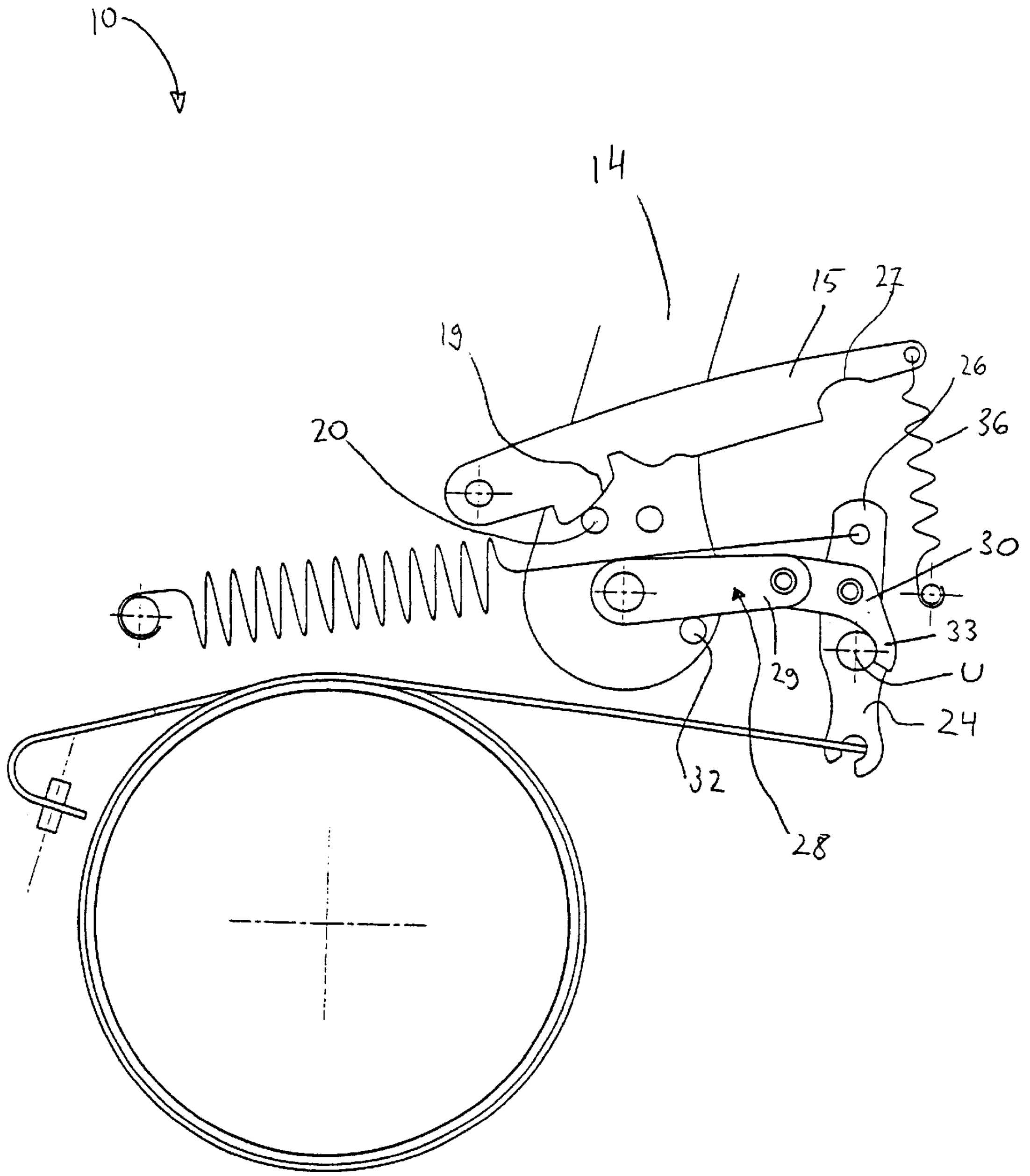
FIG. 6 is a schematic view of parts of FIG. 1 at the end of the tensioning process in accordance with FIG. 1.

FIG. 6 shows the positions of the parts of brake system 11 and of actuation arrangement 12 at the end of the tensioning process. Knee lever 28 has reached its initial position and now prevents shift lever 24 from rotating back upon a movement of lever 14 into the initial position of FIGS. 1, 2. If lever 14 is now moved into the initial position, blocking catch 15 also falls due to the tension of spring 36 back into its initial position of FIGS. 1, 2. Stop pin 20 moves tack into notch 16 and upper end 26 of shift lever 24 rests in recess 27 of blocking catch 15. The operating position of FIG. 2 has been reached again therewith.

What is claimed is:

1. A motor saw comprising a brake system for braking a motor; and a brake-system actuation arrangement comprising a lever and a positioning element, wherein the lever comprises a stop pin, and wherein the positioning element comprises a blocking catch that has a notch with a first flank and a second flank, which lever is held by the positioning element in a defined position and is deflectable so as to actuate the brake system, wherein the positioning element engages with the brake system, and wherein the positioning element limits the movement of the lever in a non-actuated brake system with a first force, and wherein the positioning element limits the movement of the lever with a second force in an actuated brake system by engaging with the brake system, and wherein the stop pin in the lever rests in the notch when the brake system is not actuated and makes contact with either the first or second flank upon a movement of the lever, depending on direction of movement of the lever.

2. The motor saw according to claim 1, wherein the blocking catch is supported in such a manner that it can rotate about an axis (P) and can be deflected about this axis (P).

3. The motor saw according to claim 1, wherein when the stop pin engages with the first or second flanks the blocking catch is deflected and exerts a return force on the stop pin and therewith on the lever.

4. The motor saw according to claim 1, wherein the motor saw further comprises a handle grip, and wherein the stop pin engages with the first flank when the lever moves in the direction of the handle grip.

5. The motor saw according to claim 4, wherein the first flank is steeper than the second flank, such that when the brake system is not actuated the return force against a movement of the lever in the direction of the handle grip is greater than in other directions.

6. The motor saw according to claim 4, wherein the first flank is arranged so that it lies vertically to the direction of movement of the stop pin, such that a movement of the lever in the direction of the handle grip is blocked when the brake system is not actuated.

7. The motor saw according to one claim 1, wherein the brake system comprises a two-membered knee lever and a shift lever.

8. The motor saw according to claim 7, wherein the two members of the knee lever are rotatable relative to one another about an axis (K1), and wherein the first member can rotate about the same axis (H) around which the lever can also rotate.

9. The motor saw according to one claim 7, wherein the knee lever and the shift lever are connected at a point in such a manner that they can rotate about an axis (K2).

10. The motor saw according to claim 7, wherein the shift lever is arranged so that it can rotate about an axis (U) and is connected on a first end to a spring that pre-tensions the shift lever in a direction of rotation, and is further connected on a second end to a brake band, wherein the pre-tensioning of the shift lever forces the brake band into a motor braking position.

11. The motor saw according to claim 7, wherein in the non-actuated position of the brake system the knee lever is in a pressed-through position and prevents a movement of the shift lever in accordance with its pre-tensioning.

12. The motor saw according to claim 7, wherein the positioning element comprises a blocking catch that comprises a recess in which the first end of the shift lever of the brake system rests in the non-actuated state of the brake system, such that a movement of the shift lever is prevented in accordance with its pre-tensioning.

13. The motor saw according to claim 12, wherein the blocking catch is raised upon a movement of the lever past a predetermined deflection and frees the shift lever for a movement in accordance with its pre-tensioning.

14. The motor saw according to claim 7, wherein the lever further comprises a pin that engages with the knee lever when the lever is moved past a predetermined deflection and presses the knee lever so as to free the shift lever for a movement in accordance with its pre-tensioning.

15. The motor saw according to claim 1, wherein the brake system comprises a brake band that brakes the motor by a movement of a shift lever.

16. The motor saw according to claim 1, wherein the brake system further comprises a brake band that brakes the motor by a movement of a shift lever, and wherein when the brake system is actuated the blocking catch is supported on the shift lever so that the stop pin no longer rests in the notch.

17. The motor saw according to claim 1, wherein when the brake system is tensioned the lever is moved in a predefined direction, so that the stop pin engages with a third flank of the blocking catch and raises it.

18. The motor saw according to claim 1, wherein the brake system comprises a two-membered knee lever, and wherein the lever further comprises a pin that engages with the knee lever upon a tensioning of the brake system and forces the knee lever into a pressed-through position, so that the knee lever moves into its pre-tensioned position.

19. The motor saw according to claim 1, wherein the brake system comprises a a shift lever, and wherein following tensioning the first end of the shift lever comes to rest in the notch of the blocking catch by a movement of the lever counter to the tensioning movement, and wherein the stop pin comes to rest in the notch of the blocking catch.

* * * * *

UNITED STATES PATENT AND TRADEMARK OFFICE

CERTIFICATE OF CORRECTION

PATENT NO. : 6,742,265 B2
APPLICATION NO. : 10/105011
DATED : June 1, 2004
INVENTOR(S) : Radel et al.

It is certified that error appears in the above-identified patent and that said Letters Patent is hereby corrected as shown below:

On the Title page, (73), the assignee name “Dolmor GmbH” should read --Dolmar GmbH--

Signed and Sealed this

Twenty-seventh Day of February, 2007

JON W. DUDAS

*Director of the United States Patent and Trademark Office*